United States Patent
Edwards et al.

(10) Patent No.: US 6,872,343 B2
(45) Date of Patent: Mar. 29, 2005

(54) PROCESS FOR IN-LINE FORMING OF PULTRUDED COMPOSITES

(75) Inventors: Christopher M. Edwards, Midland, MI (US); Edward L. D'Hooghe, Hulst (NL)

(73) Assignee: Fulcrum Composites, Inc., Midland, MI (US)

( * ) Notice: Subject to any disclaimer, the term of this patent is extended or adjusted under 35 U.S.C. 154(b) by 322 days.

(21) Appl. No.: 09/756,451

(22) Filed: Jan. 8, 2001

(65) Prior Publication Data

US 2001/0048175 A1 Dec. 6, 2001

Related U.S. Application Data

(60) Provisional application No. 60/175,982, filed on Jan. 13, 2000.

(51) Int. Cl.$^7$ .......................... B29C 51/12; B29C 47/02; B29C 53/00
(52) U.S. Cl. ...................... 264/177.17; 264/176.1; 264/171.1
(58) Field of Search .................. 264/177.17, 176.1, 264/171.1, 167, 239, 555, 280, 288.4, 288.8, 136; 156/244

(56) References Cited

U.S. PATENT DOCUMENTS

| | | | | |
|---|---|---|---|---|
| 3,507,728 A | * | 4/1970 | Bock et al. | 156/196 |
| 3,993,726 A | * | 11/1976 | Moyer | 264/171.12 |
| 4,037,011 A | * | 7/1977 | Hattori et al. | 428/299.4 |
| 4,058,581 A | * | 11/1977 | Park | 264/136 |
| 4,076,570 A | * | 2/1978 | Medley et al. | 156/244.11 |
| 4,256,797 A | * | 3/1981 | Stamper et al. | 428/215 |
| 4,290,248 A | * | 9/1981 | Kemerer et al. | 52/309.16 |
| 4,323,533 A | * | 4/1982 | Bramhall | 264/145 |
| 4,376,834 A | | 3/1983 | Goldwasser et al. | 521/159 |
| 4,559,262 A | * | 12/1985 | Cogswell et al. | 428/298.7 |
| 4,828,775 A | * | 5/1989 | Willenberg | 264/103 |
| 4,897,230 A | * | 1/1990 | Gross | 264/40.1 |
| 4,992,227 A | * | 2/1991 | Brossy | 264/112 |
| 5,106,567 A | * | 4/1992 | Demerest | 264/503 |
| 5,266,021 A | * | 11/1993 | Jacobson | 425/334 |
| 5,433,419 A | * | 7/1995 | Murakami | 264/136 |
| 5,451,355 A | * | 9/1995 | Boissonnat et al. | 264/136 |
| 5,591,463 A | * | 1/1997 | Padovani | 425/359 |
| 5,601,679 A | * | 2/1997 | Mulcahy et al. | 156/242 |
| 5,614,228 A | * | 3/1997 | Demerest | 425/326.1 |
| 5,632,838 A | * | 5/1997 | Weidner | 156/180 |
| 5,798,067 A | * | 8/1998 | Long, Sr. | 264/134 |
| 5,891,379 A | * | 4/1999 | Bhattacharyya et al. | 264/280 |
| 5,891,560 A | | 4/1999 | Edwards et al. | 428/295 |
| 5,987,838 A | * | 11/1999 | Beck | 52/519 |
| 6,086,800 A | * | 7/2000 | Manlove | 264/37.32 |
| 6,256,146 B1 | * | 7/2001 | Merrill et al. | 359/500 |
| 6,365,081 B1 | * | 4/2002 | Beck | 264/167 |

FOREIGN PATENT DOCUMENTS

| | | |
|---|---|---|
| GB | 1336669 | 11/1973 |
| JP | 05064810 | 3/1993 |
| WO | WO 99/01501 | 1/1999 |

OTHER PUBLICATIONS

Moore, Jeffrey A. "Evaluation of Environmental Stress Cracking Resistance (ESCR) of High Temperature Clear Plastics for High Voltage Electrical Devices". Society of Plastics Engineers. 1997.*

* cited by examiner

*Primary Examiner*—Michael P. Colaianni
*Assistant Examiner*—Monica A. Fontaine

(57) ABSTRACT

Pultruded composites of longitudinally oriented reinforcing fibers in a matrix of a thermoplastic resin are shaped in-line during the pultrusion process to provide a variety of non-linear or variable cross-section articles.

10 Claims, No Drawings

PROCESS FOR IN-LINE FORMING OF PULTRUDED COMPOSITES

CROSS-REFERENCE STATEMENT

This application claims the benefit of U.S. Provisional Application No. 60/175,982, filed on Jan. 13, 2000.

STATEMENT REGARDING FEDERALLY SPONSORED RESEARCH OR DEVELOPMENT

The research and development leading to the subject matter disclosed herein was not federally sponsored.

BACKGROUND OF THE INVENTION

This invention relates to a process for forming shaped pultruded composites.

Pultrusion is a known process by which composites of longitudinally oriented reinforcing fibers in a resinous matrix can be prepared. The process generally involves pulling a plurality of reinforcing fibers through an impregnation area to coat them with resin. The coated fibers are then drawn through a consolidation unit and a die, in which the coated fibers are packed tightly together and formed into the desired cross-sectional shape.

The pultrusion process is primarily used with thermoset resins, and in that case the die is heated in order to cure the resin as the fibers are being consolidated and shaped. More recently, the pultrusion process has been applied to make composites using certain depolymerizable and repolymerizable thermoplastics, especially thermoplastic polyurethanes, as described in U.S. Pat. No. 5,891,560.

A limitation of the pultrusion process is that it is adapted only to produce straight, elongated parts of uniform cross-section. This is due in part to the nature of the process itself, and in part due to the thermoset resins that are most often used. Because the process operates by pulling long, continuous reinforcing fibers through the various unit operations, it naturally forms elongated composites in which the reinforcing fibers are aligned in the direction of the pultrusion. Once cured, thermoset resins cannot be subsequently thermoformed or shaped in any other manner, yet it is necessary to cure the thermoset resin at the die in order to bind the fibers together and create the desired cross-sectional shape.

In U.S. Pat. No. 5,798,067 to Long, a process is described whereby a shaped pultruded composite is made. In this process, a roving consisting of a plurality of fibers in a partially cured thermoset resin is formed. This roving is then passed through a pair of heated, matched rotary dies that simultaneously impart the desired shape to the roving and cure the thermoset resin. In actual practice, however, this process is difficult to manage. The cure of the thermoset resin must be very carefully managed so that the resin can hold the individual fibers in the roving together until the final cure is complete, yet permit the roving to be shaped by the rotary dies. It is not practical to achieve this on a commercial scale.

Thus, it would be desirable to provide a pultrusion process that is capable of producing profiles incorporating regular, predictable curvatures or torsional twists.

SUMMARY OF THE INVENTION

This invention is a process for preparing a fiber-reinforced thermoplastic composite article comprising the steps of:
a) drawing a fiber bundle continuously through a melt obtained by heating a rigid thermoplastic;
b) impregnating the drawn fiber bundle with the melted rigid thermoplastic to form a composite melt;
c) drawing the composite melt through a consolidation die to form a thermoformable shaped article;
d) thermoforming the shaped article on-line; and
e) cooling the shaped article to solidify the thermoplastic.

This method permits the direct, one-step manufacture of fiber-reinforced composite articles in a variety of shapes. This method significantly expands the number of applications for which the fiber-reinforced composites can be used, and/or greatly simplifies the formation of specialized parts from the composite.

DETAILED DESCRIPTION OF THE INVENTION

The general pultrusion process of steps a)–c) are described, for example, in U.S. Pat. No. 5,891,560. The general process described in that patent advantageously includes pulling a plurality of reinforcing fibers (a fiber bundle) through a fiber preheat station. The preheat station conveniently includes one or more ceramic heaters. Volatiles, mainly water, are removed from the fibers through the preheating. In addition, the fibers are heated above the solidification temperature of the thermoplastic resin.

The thermoplastic melt is conveniently prepared by granulating the solid resin, drying it (preferably to no more than 200 ppm, more preferably to no more than 100 ppm water) and extruding it through a heated single-screw extruder. The extruder melts the thermoplastic through shear and heat. In the preferred embodiment, the extruder also causes partial depolymerization of the thermoplastic. The melted thermoplastic is then transported by way of a heated resin channel to an impregnation unit.

An impregnation unit as described in U.S. Pat. No. 5,891,560 is suitable herein. In the impregnation unit, the preheated reinforcing fibers are wetted with the melted thermoplastic. The impregnation unit is heated to a temperature sufficient to keep the thermoplastic resin melted, and in the preferred embodiment, to maintain the thermoplastic resin in a partially depolymerized state. A temperature of from about 200° to 300° C. is suitable. The impregnation unit contains equipment that provides intimate contact between the fibers and the melted thermoplastic. As described in U.S. Pat. No. 5,891,560, the wetter fibers are advantageously passed through apparatus such as a plurality of wet-out rods to ensure that substantially the entire surface of the fibers is coated with the melted resin.

The wetted fibers are then passed through a consolidation unit, which forces the fibers into close contact with each other, shapes the fiber bundle into the desired shape and removes excess thermoplastic resin. As shown in U.S. Pat. No. 5,891,560, the consolidation unit can include a plurality of wipe-off plates, each having an opening through which the wetted fiber bundle passes. The opening of each successive wipe-off plate is smaller than that of the one before, so that the dimensions of the opening of the last wipe-off plate match the cross-sectional dimension of desired part.

As described in U.S. Pat. No. 5,891,560, the shaped fiber bundle is then passed through a cooling die that provides the final shape, usually imparts a smooth surface, and cools the thermoplastic below its solidification temperature.

In this invention, the foregoing process is improved by adding an in-line thermoforming step, by which the part is curved or twisted, or the cross-sectional shape of the pultruded part becomes varied along its length. The on-line thermoforming step can be achieved in several ways.

One way of performing the in-line forming is to pass the shaped composite through a rotary/caterpillar-type die of the general type described in U.S. Pat. No. 5,798,067 to Long. This method is primarily is suitable for thinner composites, such as less than about 1 mm in thickness. At the point at which the composite enters the rotary die, its temperature is sufficiently high that the thermoplastic resin is at least softened enough that the composite can be shaped under the pressure imposed by the rotary die. The die itself may be heated. It is preferred that as it exits the die, the composite is cooled sufficiently that it holds the shape imparted to it in the die.

A suitable rotary die includes two matched die molds, each mounted on an endless loop. The composite enters the die between the two molds, which are spaced apart so that the composite becomes shaped by the molds. The die molds rotate at the same speed and direction as the composite as it is pultruded, so that the molding is done in-line and continuously.

If necessary, a cooling unit can follow the rotary die, so that the thermoplastic resin is cooled below its solidification temperature.

A second way of thermoforming the composite on-line is to impart twisting about the composite's longitudinal axis. This is achieved by passing the composite through a pair of moving caterpillar rollers that are oriented perpendicular to the direction of the pultrusion, while maintaining the composite at an elevated temperature such that it remains thermoformable. The caterpillar rollers move in opposite directions, thereby pushing opposing sides of the composite in opposite directions to create a twisting effect.

Another way of twisting the composite is to employ a cooling die having any cross-sectional shape except a circle, and to rotate the die during the pultrusion process. A uniform twist can be imparted to the composite by continuously rotating the die during the pultrusion. Rotating the die discontinuously can create intermittent twisting.

Yet another way of thermoforming the composite on-line is to modify the haul-off apparatus so that one side of the composite is pulled off faster than the other side. In this method, the composite is kept at an elevated temperature so that it is still thermoformable as it passes through the haul-off apparatus. The composite is then cooled after passing through the haul-off apparatus. The difference in line speed from one side of the composite to the other causes curves to form. Intermittent curving can be created by cycling between periods during which one side faster is hauled off than the other, and periods during which both sides are hauled off at the same speed. Sinusoidal curves can be created by cycling between hauling off one side faster than the other, and then reversing the relative rates at which the sides are hauled off.

Another way of achieving the same effect is to use a curved cooling die that is equipped with an internal means, such as pins, which force some of the reinforcing fibers to travel a longer path through the die than others. The internal means forces some of the fibers to follow a path through the die near the outside of the curve, and others to follow a shorter path near the inside of the curve. This results in a small difference in velocity between the fibers on the inside and outside of the curve, which results in forming a curved composite. In the cooling die, the thermoplastic is solidified, thereby locking the curvature into the composite.

Yet another way of forming a shaped composite on line is to use a rotating and/or oscillating mandrel as the means for pulling the composite through the die. The thermoplastic is cooled below its solidification temperature after the composite is wound on the mandrel. This permits coiled or looped elements to be formed. For example, a circular mandrel oriented perpendicularly to the direction of the reinforcing fibers can form circular elements. If that same circular mandrel is oscillated back and forth along its axis of rotation, spiraled elements are formed. Thus, the use of such a mandrel can be used to form (a) circular elements wrapped around the mandrel which can be subsequently cut off to form individual curved elements, (b) a continuous spring, such as a coil spring or a coiled reinforcement for a collapsible tube (such as a vacuum cleaner hose), or (c) a wound pipe. The windings in the pipe may vary from circumferential to a large angle spiral.

In like manner, varying the shape of the mandrel can make other wound shapes such as squares, semicircles, ellipses, polygons and the like. In addition, the mandrel may be shaped so that the overwound composite takes on a more complex form. For example, a circular mandrel of varying diameter can be used to make a tapered element. After the winding is completed, the mandrel may be removed or left in the wound composite. For example, a reinforced pipe is easily made by using a hollow mandrel, overwrapping the hollow mandrel with the composite of the invention, and then permitting the mandrel to stay within the overwrapped composite.

In addition, channels may be cut into the mandrel. These channels can impart a desired cross-sectional shape to the composite at the same time as curves, twists or other shaping is accomplished.

The reinforcing fiber can be any strong, stiff fiber that is capable of being processed into a composite through a pultrusion process. Suitable fibers are well known and are commercially available. Glass, other ceramics, carbon, metal or high melting polymeric (such as aramid) fibers are suitable. Mixtures of different types of fibers can be used. Moreover, fibers of different types can be layered or interwoven within the composite in order to optimize certain desired properties. For example, glass fibers can be used in the interior regions of the composite and more expensive fibers such as carbon fibers used in the exterior regions. This permits one to obtain the benefits of the high stiffness of the carbon fibers while reducing the overall fiber cost.

Glass is a preferred fiber due to its low cost, high strength and good stiffness.

Suitable fibers are well known and commercially available. Fibers having diameters in the range of about 10 to 50 microns, preferably about 15–25 microns, are particularly suitable.

The reinforcing fiber is longitudinally oriented in the composite. By "longitudinally oriented", it is meant that the reinforcing fibers extend essentially continuously throughout the entire length of the composite, and are aligned in the direction of pultrusion.

As it is the fibers that mainly provide the desired reinforcing properties, the fiber content of the composite is preferably as high as can conveniently be made. The upper limit on fiber content is limited only by the ability of the thermoplastic resin to wet out the fibers and adhere them together to form an integral composite without significant void spaces. The fibers advantageously constitute at least 30 volume percent of the composite, preferably at least 50 volume percent and more preferably at least 65 volume percent.

The thermoplastic resin can be any that can be adapted for use in a pultrusion process to form the composite and which does not undesirably react with the reinforcing fibers. However, the thermoplastic resin preferably has additional characteristics. The thermoplastic resin preferably is a rigid polymer, having a $T_g$ of not less than 50° C. In addition, the thermoplastic resin preferably forms a low viscosity melt during the pultrusion process, so as to facilitate wetting out the reinforcing fibers. Among the useful thermoplastics are the so-called "engineering thermoplastics", including polystyrene, polyvinyl chloride, ethylene vinyl acetate, ethylene vinyl alcohol, polybutylene terephthalate, polyethylene terephthalate, acrylonitrile-styrene-acrylic, ABS (acrylonitrilebutadiene-styrene), polycarbonate, aramid and polypropylene resins, and blends thereof.

A particularly suitable thermoplastic resin is a depolymerizable and repolymerizable thermoplastic (DRTP). Examples of these are rigid thermoplastic polyurethanes or polyureas (both referred to herein as "TPUs"). TPUs have the property of partially depolymerizing when heated due in part to the presence of residual polymerization catalyst. The catalyst is typically hydrolytically- and thermally stable and is "live" in the sense that it is not inactivated once the TPU has been polymerized. This depolymerization allows the TPU to exhibit a particularly low melt viscosity, which enhances wet-out of the fibers. Upon cooling, the polyurethane repolymerizes to again form a high molecular weight polymer.

Suitable thermoplastic polyurethanes are described, for example, in U.S. Pat. No. 4,376,834 to Goldwasser et al. Fiber-reinforced thermoplastic composites suitable for use in the invention and which are made using such rigid TPUs are described in U.S. Pat. No. 5,891,560 to Edwards et al.

The composites described in U.S. Pat. No. 5,891,560 include a continuous phase which is advantageously a polyurethane or polyurea (or corresponding thiourethane or thiourea) impregnated with at least 30 percent by volume of reinforcing fibers that extend through the length of the composite. The general pultrusion process described in U.S. Pat. No. 5,891,560 includes the steps of pulling a fiber bundle through a preheat station a fiber pretension unit, an impregnation unit, a consolidation unit that includes a die which shapes the composite to its finished shape, and a cooling die. The pulling is advantageously accomplished using a haul off apparatus, such as a caterpillar-type haul off machine. Additional shaping or post-forming processes can be added as needed.

As described in U.S. Pat. No. 5,891,560, the preferred continuous phase polymer is a thermoplastic polyurethane or polyurea made by reacting approximately stoichiometric amounts of (a) a polyisocyanate that preferably has two isocyanate groups per molecule, (b) a chain extender, and optionally (c) a high equivalent weight (i.e., above 700 to about 4000 eq. wt.) material containing two or more isocyanate-reactive groups. By "chain extender", it is meant a compound having two isocyanate-reactive groups per molecule and a molecular weight of up to about 500, preferably up to about 200. Suitable isocyanate-reactive groups include hydroxyl, thiol, primary amine and secondary amine groups, with hydroxyl, primary and secondary amine groups being preferred and hydroxyl groups being particularly preferred.

Preferred TPUs are rigid, having a glass transition temperature ($T_g$) of at least 50° C. and a hard segment content (defined as the proportion of the weight of the TPU that is made up of chain extender and polyisocyanate residues) of at least 75%. Rigid thermoplastic polyurethanes are commercially available under the trade name ISOPLAST® engineering thermoplastic polyurethanes. ISOPLAST is a registered trademark of The Dow Chemical Company.

"Soft" polyurethanes having a $T_g$ of 25° C. or less can be used, but tend to form a more flexible composite. Thus, "soft" polyurethanes are preferably used as a blend with a rigid thermoplastic polyurethane. The "soft" polyurethane is generally used in a proportion sufficient to increase the elongation of the composite (in the direction of the orientation of the fibers). This purpose is generally achieved when the "soft" polyurethane constitutes 50% or less by weight of the blend, preferably 25% or less.

The preferred DRTP can be blended with minor amounts (i.e., 50% by weight or less) of other thermoplastics, such as polystyrene, polyvinyl chloride, ethylene vinyl acetate, ethylene vinyl alcohol, polybutylene terephthalate, polyethylene terephthalate, acrylonitrile-styrene-acrylic, ABS (acrylonitrile-butadiene-styrene), polycarbonate, polypropylene and aramid resins. If necessary, compatibilizers can be included in the blend to prevent the polymers from phase separating.

The method of this invention enables the production of a large number of nonlinear parts and/or parts having a variable cross-section. For example, the method is useful to produce parts such as leaf or coil springs, pipe, reinforced pipe, window lineals, curved reinforcement members, automobile bumpers, twisted reinforcing bars for, e.g., concrete reinforcement, "rope" made from twisted strands of the composite, and the like.

What is claimed is:

1. A pultrusion process for preparing a continuous fiber-reinforced thermoplastic composite article by continuously pulling the fibers through a process comprising the steps of:
    a) drawing a fiber bundle continuously through a melt obtained by heating a thermoplastic resin;
    b) impregnating the drawn fiber bundle with the melted thermoplastic resin to form a composite melt;
    c) drawing the composite melt through a consolidation die to form a thermoformable composite profile;
    d) thermoforming the composite profile on-line to form along the length of the article: 1) a curve formed by hauling off one side of said composite profile at a faster rate than another side; 2) a twist; or 3) a varied cross-sectional shape; and
    e) cooling the shaped composite article to solidify the thermoplastic resin and provide an article that is curved, twisted or provided with a varied cross-sectional shape along its length.

2. The process of claim 1, wherein said thermoplastic resin includes a depolymerizable and repolymerizable thermoplastic resin having a $T_g$ of not less than 50° C.

3. The process of claim 1, wherein said thermoforming is performed by passing said composite profile shaped article through a rotary/caterpillar-type die, at a temperature sufficiently high that the thermoplastic resin is at least softened enough that the composite profile can be shaped under the pressure imposed by the rotary die, and then cooling the shaped composite article to a temperature below the solidification temperature of the thermoplastic resin.

4. The process of claim 1 wherein said thermoforming is performed by passing said composite profile through a rotating die while maintaining the composite profile at an elevated temperature such that it remains thermoformable, and then cooling the shaped composite article to a temperature below the solidification temperature of the thermoplastic resin.

5. The process of claim 1, wherein said thermoforming takes place while maintaining the composite profile at an elevated temperature such that it remains thermoformable, and then cooling the shaped composite article to a temperature below the solidification temperature of the thermoplastic article.

6. The process of claim 5, wherein said composite profile is passed through a curved cooling die that is equipped with an internal means which forces some of the reinforcing fibers to travel a longer path through the die than others, and wherein the thermoplastic is solidified in said cooling die, thereby forming a curved composite article.

7. The process of claim 1, wherein said thermoforming is performed by winding said composite profile on a mandrel as the means for pulling the composite through the die, and then cooling said shaped composite article to a temperature below the solidification temperature of the thermoplastic resin.

8. The process of claim 2, wherein said depolymerizable and repolymerizable thermoplastic is a thermoplastic polyurethane or polyurea.

9. The process of claim 1, wherein said reinforcing fibers are glass, other ceramic, carbon, metal or polymeric fibers.

10. The process of claim 2, wherein said thermoplastic resin is a blend of a depolymerizable and repolymerizable polyurethane or polyurea with one or more of resins selected from the group consisting of: polystyrene, polyvinyl chloride, ethylene vinyl acetate, ethylene vinyl alcohol, polybutylene terephthalate, polyethylene terephthalate, acrylonitrile-styrene-acrylic, ABS (acrylonitrile-butadiene-styrene), polycarbonate, aramid and polypropylene resin.

* * * * *